United States Patent [19]

Clausen

[11] Patent Number: 4,986,597
[45] Date of Patent: Jan. 22, 1991

[54] VEHICLE SPACE FRAME AND A METHOD FOR MANUFACTURING OF VEHICLE SPACE FRAME PARTS

[75] Inventor: Edvin L. Clausen, Tonder, Denmark

[73] Assignee: Norsk Hydro A.S., Oslo, Norway

[21] Appl. No.: 488,008

[22] PCT Filed: Aug. 29, 1989

[86] PCT No.: PCT/NO89/00086

§ 371 Date: May 9, 1990

§ 102(e) Date: May 9, 1990

[87] PCT Pub. No.: WO90/02680

PCT Pub. Date: Mar. 22, 1990

[30] Foreign Application Priority Data

Sep. 9, 1988 [NO] Norway ................................ 884034

[51] Int. Cl.[5] ........................................... B62D 21/00
[52] U.S. Cl. ..................................... 296/205; 296/203; 296/204; 29/412; 29/425; 72/369; 52/730
[58] Field of Search ............... 296/205, 203, 204, 194, 296/195; 29/412 X, 425 X, 469.5; 72/369 X, 324; 52/732, 730

[56] References Cited

U.S. PATENT DOCUMENTS

| | | | |
|---|---|---|---|
| 2,113,399 | 4/1938 | Dietrich | 280/793 |
| 3,264,010 | 8/1966 | Pierce | 280/792 |
| 3,292,969 | 12/1966 | Eggert, Jr. | 296/205 |
| 4,355,844 | 10/1982 | Muzzarelli | 296/205 |
| 4,533,172 | 8/1985 | Oliver | 296/205 |
| 4,660,345 | 4/1987 | Browning | 296/205 |
| 4,726,166 | 2/1988 | DeRees | 52/732 |
| 4,735,355 | 4/1988 | Browning | 228/189 |
| 4,807,925 | 2/1989 | Sakamoto | 296/205 |
| 4,840,424 | 6/1989 | Asoh | 296/204 |

FOREIGN PATENT DOCUMENTS

| | | |
|---|---|---|
| 0303432 | 2/1989 | European Pat. Off. . |
| 1902391 | 9/1969 | Fed. Rep. of Germany . |
| 1630365 | 1/1971 | Fed. Rep. of Germany . |
| 120799 | 2/1948 | Sweden . |

OTHER PUBLICATIONS

Patent Abstracts of Japan, vol. 11, No. 296, M627, abstract of JP 62-88675, published Apr. 23, 1987, Honda Motor Co., Ltd.

*Primary Examiner*—Robert R. Song
*Attorney, Agent, or Firm*—Wenderoth, Lind & Ponack

[57] ABSTRACT

A vehicle space frame comprising load bearing longitudinal structural members (2) formed from an integral extruded multicavity shape being split, reshaped and aligned to secondary complementary shaped members (8) is provided. A new method of joining the structural members is based on longitudinal internesting of complementary shaped outer surfaces of the members forming the supportive structure of the space frame.

8 Claims, 3 Drawing Sheets

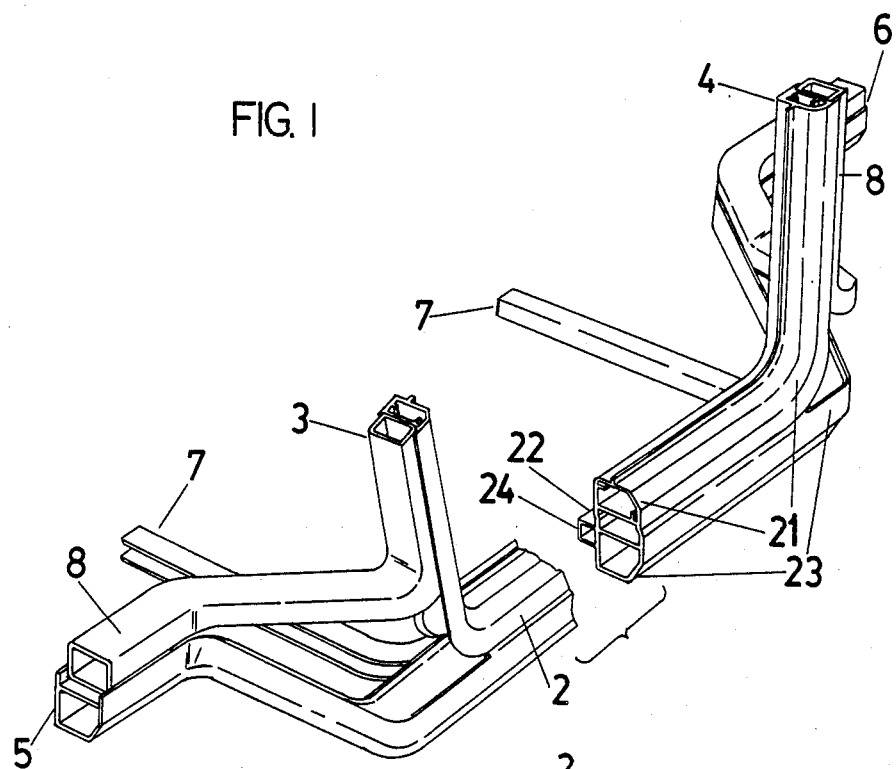
FIG. 1
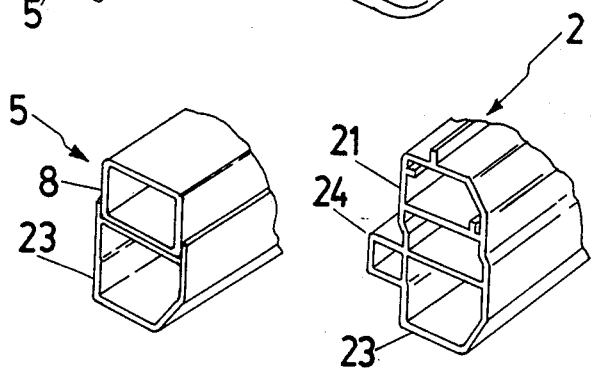
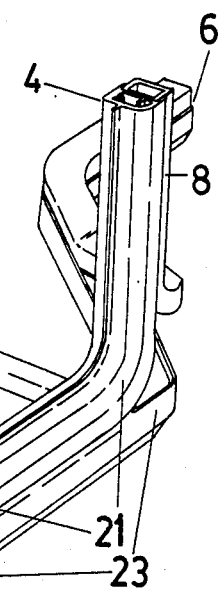
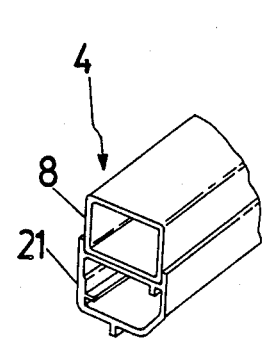
FIG. 1a     FIG. 1c     FIG. 1b

VEHICLE SPACE FRAME AND A METHOD FOR MANUFACTURING OF VEHICLE SPACE FRAME PARTS

BACKGROUND OF THE INVENTION

The present invention relates to a vehicle body structure, and more particularly to a load-bearing space frame, and to a method of manufacturing thereof.

A space frame for a motor vehicle, comprising a plurality of elongated metal structural members having axially uniform cross-sections joined together by a plurality of interconnecting metal castings, is known from the prior art, e.g. as disclosed in U.S. Pat. No. 4,735,355. Specially designed castings, having a saddle portion with a contour matching a portion of the cross-section of the structural member, ensure a joint of two or several structural members at a given angle. Furthermore, the saddle portion and a tubular portion of the casting are provided with outer peripheral edges lying along the outer surface of the structural members, where a welded bead is deposited along these edges in order to reinforce the joint areas.

U.S. Pat. No. 4,355,844 discloses another load-bearing structure for a motor vehicle based on tubular members (girders) joined together by connectors composed of shell elements of thin sheet metal, provided with longitudinal flanges having a plurality of tubular connection stubs. Another construction of the vehicle space frame is disclosed in European Patent Application No. 0146716. This frame comprises hollow shapes extruded from light metal and forming elongated structural members, connectors of different shapes or configurations adapted to the shape of the structural members and optionally provided with protruding/recessing parts in order to incorporate other parts of the vehicle body and finally plate (blanket) parts of different materials (light metals, steel, plastic) to complete the frame structure.

All the disclosed space frames are assembled from a large number of individually designed and dimensioned parts and members. The obvious disadvantages of such space frames are the large number of joints, the necessity to provide costly, specially made connectors and secondary use of reinforcing means in order to achieve satisfactory stiffness and strength of the frame. All these factors adversely affect the vehicle weight, the assembly cost of the space frame, as well as the of the frames ability to absorb certain amounts of energy for attaining predictable collision performance.

SUMMARY OF THE INVENTION

It is therefore an object of the present invention to provide an automobile space frame which is simple in construction, light in weight, has few joints generally and no joints situated in critical frame areas and at the same time providing improved collision strength of the construction.

Another object of the present invention is to provide a manufacturing method based on simple assembling of specially designed load-bearing structural members with no need for specially designed connectors or supplementary reinforcement means. Still another object is to provide a frame assembled from extruded light metal hollow shapes cut and formed to required lengths and configurations from substantially endless stock.

According to the present invention the above and other objects can be accomplished, in a preferred embodiment, by provision of a vehicle space frame, the supportive structure of which comprises load-bearing structural members and secondary complementary shaped structural members where the load-bearing members include an integral multicavity shape being longitudinally split at its ends and reshaped to form several integrated structural parts of the supportive structure.

In a particularly advantageous embodiment of the invention the multicavity shape is longitudinally split from both ends into two individual sections, the upper sections being upwardly bent to form parts of the front and rear pillars, and the lower sections being reshaped to a stepped configuration of a side structure of the space frame.

In a further embodiment of the invention the multicavity shape is also provided with a laterally projecting and longitudinally extending protrusion that is partially removed from the shape and bent perpendicularly thereto to form an interconnecting cross-structural member of the space frame.

In contrast to known space frame constructions there is no need for specially designed connectors having interfitting configurations or welding operations for assembling individual structural members. The individual reshaped sections of the multicavity shape are simply aligned to the secondary complementary shaped members that are internested in the correspondingly shaped outer surfaces of the shape sections.

BRIEF DESCRIPTION OF THE DRAWINGS

The above and other objects and features of the present invention will become more apparent from the following detailed description of preferred embodiments referring to the accompanying drawings, where:

FIG. 1 is a fragmentary perspective view of a space frame in accordance with the a preferred embodiment of the present invention, FIGS. 1a, 1b and 1c are enlarged vertical cross-sectional views of a rear brace a forward pillar of the space frame and an integral load-bearing structural member, respectively.

DETAILED DESCRIPTION OF THE INVENTION

Figure 2:
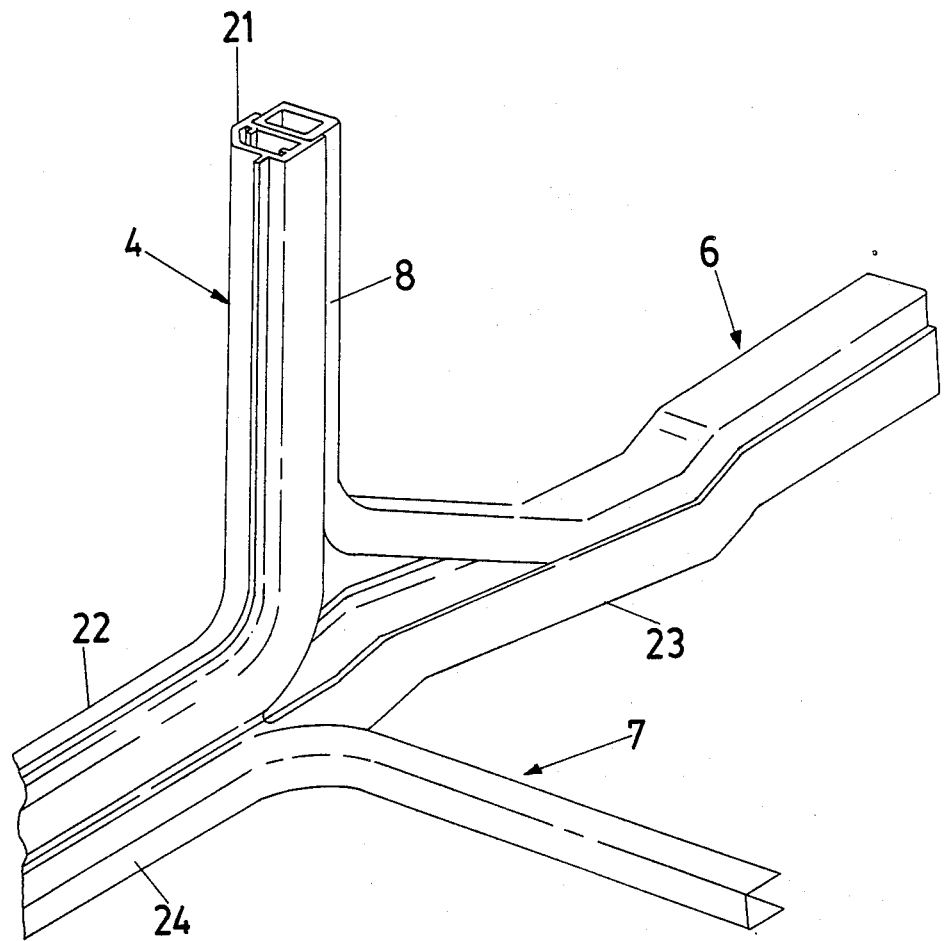
FIG. 2 is a fragmentary perspective view of a space frame illustrating a detail of an additional structure feature.

Referring to the drawings, particularly to FIG. 1, the vehicle space frame 1 shown therein in a fragmentary, particularly broken perspective view includes a load-bearing structural member 2 and complementary structural members 8 as the only standard members composing a core of the space frame. The load-bearing member 2 is of a closed cross-section provided as an integrally extruded multicavity shape comprising parts or sections 21,22,23 having three individual and vertically spaced interiors or voids and one laterally extending flange 24 of a closed cross-section.

The upper part of the multicavity shape comprising the top section 21 is partially removed from opposite end portions of the bottom part/section 23 by splitting longitudinally the central straight section 22, e.g. by cutting, and is subsequently bent essentially vertically or at a predeterminated angle to form a part of a front pillar 4 and a rear 3 pillar of the frame, respectively. Secondary complementary shaped structural members 8 are aligned and joined by any conventional means (not shown in the drawings) to the resulting vertically bent sections and the remaining forward and backward running sections, formed by the remaining bottom part 23 of the multicavity cavity shape, thus "bridging" the split multicavity shape and forming a required stepped configuration of the side vehicle body structure.

Details of the joints are illustrated in FIG. 1a, FIG. 1b and FIG. 1c showing in cross-section the resulting rear brace 5, the forward pillar 4 and the central integral straight section of the multicavity shape 2 from the FIG. 1, respectively. The front pillar 4 and the rear pillar 3 are parts of framework for a vehicle door. The joints between the secondary complementary shaped structure members 8 and the reshaped sections 21,23 of the multicavity shape forming the pillars are accomplished by longitudinal internesting of such parts or members.

The secondary members 8 each have a simple rectangular outer shape that fits into a complementary cup-shaped recess of the section 21 or 23 where two longitudinal protruding flanges forming the cup-like nesting configuration of the sections 21,23 are provided by the above described longitudinal cutting of the multicavity shape. The resulting joints, due to their position in the vicinity of the neutral axis (center) of the thereby formed doubled section, will be exposed only to minor stresses compared to the previously known frame designs.

FIG. 2 shows a detail of a triple joint between a front pillar 4, front brace 6 and a transverse girder 7 completely eliminating the use of specially made connectors. The straight section 22 of the multicavity shape is simply split and bent into the upwardly extending top section 21 and forwardly extending bottom section 23, the sections being joined to the secondary member 8 by means of the above described nested joints. The perpendicularly extending transverse girder 7 is formed by partly removed and bending flange 24 of the multicavity shape.

Figures 3, 3A:
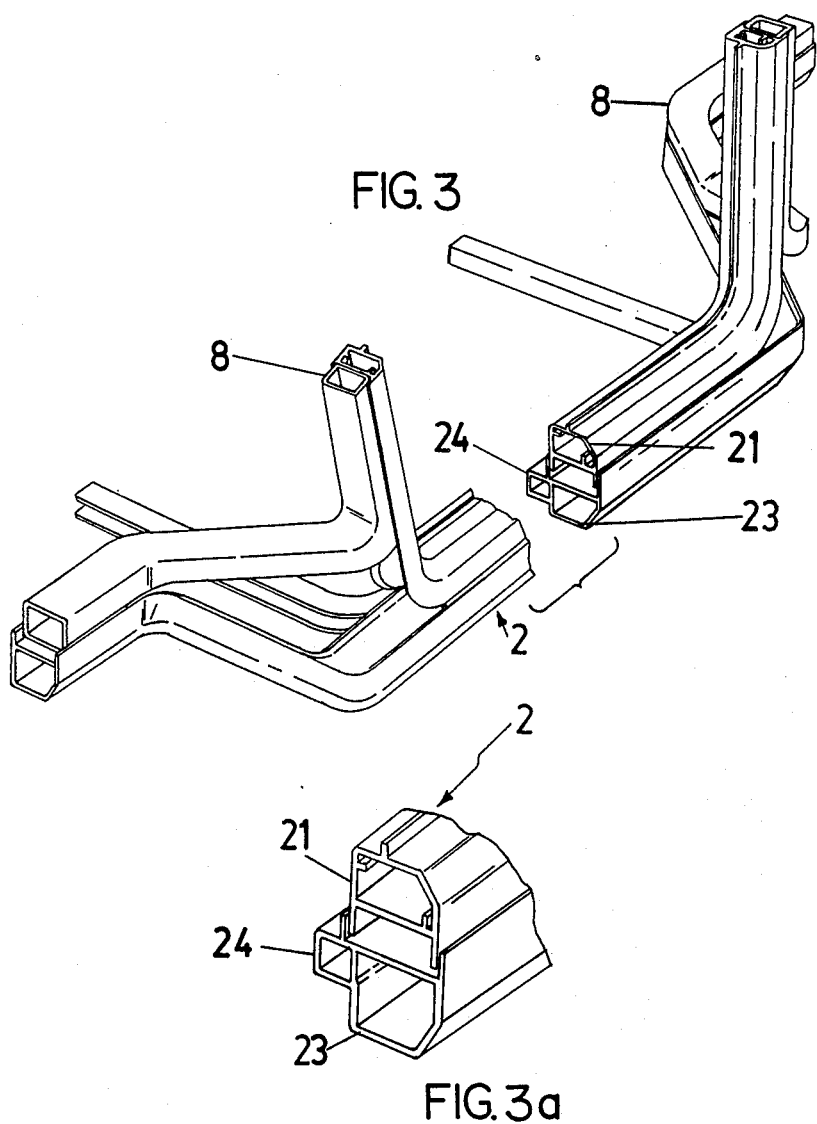
FIG. 3 is a fragmentary perspective view of another embodiment of a space frame.
FIG. 3a is an enlarged vertical cross-sectional view of a load bearing structural member.

FIG. 3 shows another embodiment of the space frame according to the present invention. In this case instead of one integrally extruded multicavity shape two separate hollow shapes 21,23 provided with longitudinal protruding flanges to accomodate secondary complementary shaped members 8 are provided to form in a similar matter the load bearing member 2. The bottom shape 23 is also provided with a laterally extending flange 24 as seen in FIG. 3a illustrating an enlarged vertical sectional view of a straight section of the joined shapes 21,23 forming the load bearing member 2.

The new way of forming and joining the individual structural members of the frame according to the present invention obviously reduces the number of parts required and eliminates the necessity of applying welded connections or special connectors designed to support the joints situated in critical areas of the frame. Thus, a maximal strength and optimal weight of the structure is achieved in the most loadexposed area between the front and rear pillars of the frame.

The structural members may be further secured to each other by any of the known and currently used fastening methods, e.g. by bonding/riveting, welding or by other mechanical means. Other advantages inherent in the structural members of the present invention being provided as extruded hollow shapes made of light metal, e.g. aluminum and its alloys, reside in the fact that the members may be easily adapted to serve additional purposes as well. For example the shapes can be extruded with integral brackets or flanges to facilitate mounting of other components of the frame space.

I claim:

1. A method of manufacturing a vehicle space from including longitudinally extending structural members, said method comprising:
   providing an integrally extruded multicavity shape and at least one secondary member;
   partially splitting said multicavity shape from at least one end thereof to provide plural longitudinally extending individual sections of predetermined length;
   bending said individual sections at predetermined angles and aligning the thus bent individual sections to said at least one secondary member to be complementary thereto thus forming structural parts of a vehicle space frame; and
   fastening the thus assembled members by joining means.

2. A method as claimed in claim 1, comprising forming said structural parts of said vehicle space frame as front and rear pillars and front and rear braces.

3. A method as claimed in claim 1, wherein all the structural members of said frame are formed by extruding aluminum or aluminum alloys.

4. A load-bearing structural member comprising:
   an extruded shape having a straight section longitudinally split from at least one end thereof into at least two individual sections; and
   at least one of said individual sections being reshaped to extend at a predetermined angle to said straight section to form an additional structural part of a supportive space frame.

5. A load bearing structural member as claimed in claim 4, wherein said extruded shape includes at least one integral laterally projecting and longitudinally extending flange.

6. A vehicle space frame comprising longitudinally extending load-bearing structural members, each said load-bearing structural member comprising:
   an integrally extruded multicavity shape having at least one end thereof longtiudinally split into at least two individual sections; and
   said individual sections extending at predetermined angles to said shape, thus forming structural parts of the frame.

7. A vehicle space frame as claimed in claim 6, wherein each said structural part further includes a secondary shaped member complementary to said individual sections and connected thereto by internested joints.

8. A vehicle space frame as claimed in claim 6, wherein said multicavity shape further includes a laterally projecting flange forming at least one transverse girder extending perpendicular to said shape.

* * * * *